G. C. CURTNER.
TIRE CHAIN TIGHTENER AND LOCK.
APPLICATION FILED MAY 18, 1917.
1,277,296. Patented Aug. 27, 1918.
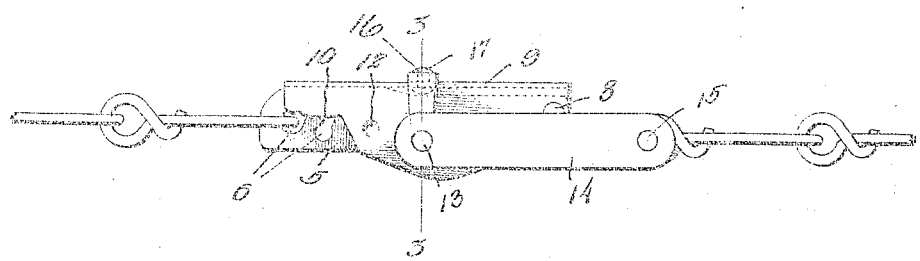
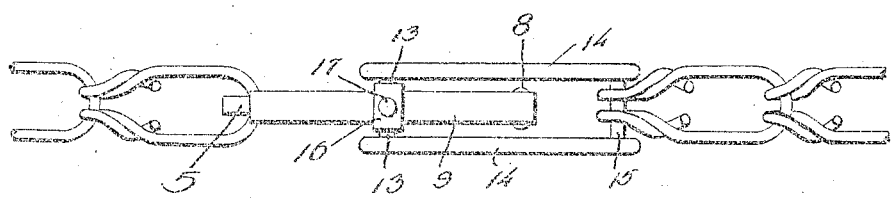
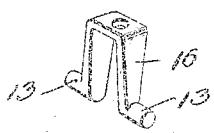
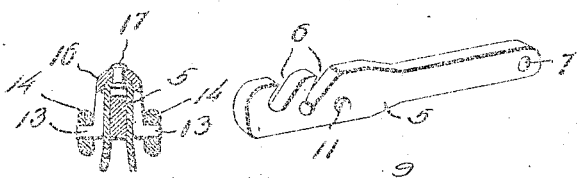
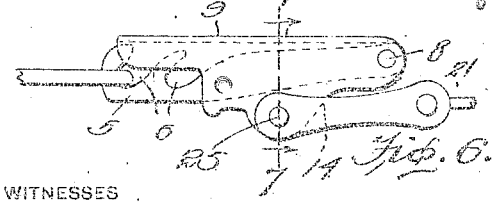
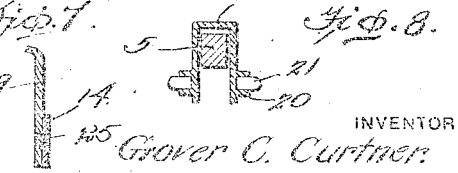
INVENTOR
Grover C. Curtner
WITNESSES
BY
ATTORNEY

UNITED STATES PATENT OFFICE.

GROVER C. CURTNER, OF NEW YORK, N. Y.

TIRE-CHAIN TIGHTENER AND LOCK.

1,277,296.

Specification of Letters Patent. Patented Aug. 27, 1918.

Application filed May 18, 1917. Serial No. 169,544.

*To all whom it may concern:*

Be it known that I, GROVER C. CURTNER, a citizen of the United States, residing at New York, in the county of New York and State of New York, have invented certain new and useful Improvements in Tire-Chain Tighteners and Locks, of which the following is a specification.

This invention relates to tire chain tighteners and locks, and aims primarily to simplify and improve devices of this character.

A further object of the invention is to provide a locking device for the ends of vehicle tire chains, which is so constructed and arranged that when properly applied to a chain upon a vehicle wheel, danger of the lock becoming accidentally opened will be obviated. A further object is to provide a lock of this character which is arranged so as to minimize the opportunity for the lock to become opened when the wheel is traveling through a depression or rut in the road.

Still further objects reside in providing a lock of the type mentioned which is of extremely simple and inexpensive construction, which is composed of but few readily assembled parts, which is featured by the lack of complicated mechanism, which has its parts so assembled as to minimize the opportunity for wear, breakage, or derangement, which is easy and simple of operation, and which will prove thoroughly efficient in the attainment of the ends for which it is designed.

With these objects in view together with others which will appear as the description proceeds, the invention resides in the novel formation, combination, and arrangement of parts, all as will be described more fully hereinafter, illustrated in the drawings, and particularly pointed out in the claim.

In the drawings:

Figure 1 is a side elevation of a tire chain tightener constructed in accordance with the invention, the view illustrating the manner in which the fastener is applied to a chain, Fig. 2 is a top plan view of the mechanism shown in Fig. 1, Fig. 3 is a sectional view taken upon line 3—3 of Fig. 1, Fig. 4 is a detail perspective view of the link attaching clevis, Fig. 5 is a detail perspective view of the hook block, Fig. 6 is a side elevation of a fastener embodying a slightly modified form of the invention, Fig. 7 is a sectional view taken on line 7—7 of Fig. 6, and illustrating the manner in which the connecting links may be secured to the lever, and Fig. 8 is a sectional view taken through a further modified form of tightener.

In carrying out the invention, a metallic bar 5 is used, which bar constitutes the block hereinafter referred to, and is notched adjacent one end and upon its upper edge as at 6. These notches have their walls angularly inclined as shown, and constitute hooks to receive one end of the tire chain with which the improved lock is to be used. The end of the block 5 remote from the hook portion is apertured as at 7, and receives a pivot pin 8. This pin 8 effects a pivotal connection between the block 5 and one end of a lever 9. The lever is constructed preferably of relatively thin sheet metal, and is bent longitudinally as shown, so as to fit snugly over the block 5 when swung in one direction upon the latter. The sides of the lever 9 at the free ends thereof are cut away as at 10, so that the said lever will not engage a chain link resting within either of the notches 6 of the base.

The side walls of the block 5 are provided with depressions 11, and the corresponding portions of the side walls of the lever 9 are similarly formed, as indicated at 12. The inwardly projecting portions 12 of the lever are adapted to snap within the depressions 11 on the base, to hold the lever and base in closed or interlocking position.

Projecting outwardly from the sides of the lever 9 are trunnions 13, over which are engaged the inner ends of links 14. The links in the present instance are connected at their outer ends by a pin 15, and one end of a tire chain may be attached to this connecting pin. The trunnions 13 are so positioned upon the sides of the lever 9 that when the latter is swung down upon the block 5, the said trunnions will be disposed below the plane of the pivot 8 and the bottoms of the recesses or notches 6. In the preferred embodiment of the invention, the trunnions are formed by turning outwardly the extremities of a U-shaped clevis 16, the latter straddling the lever 9 inwardly from the ends thereof, and being secured to the said lever by a screw or rivet 17.

In the modified form of the invention illustrated in Fig. 8, I omit the use of the clevis 16, and provide the downwardly extending portions of the lever 9 with outwardly projecting bosses 20. These bosses are recessed, and receive the inturned ends of a link 21. In that form of the invention illustrated in Figs. 6 and 7, the links 14 are pivotally secured to the downwardly extending sides of the lever 9 by rivets 25.

In practice, the improved chain tightener and lock may be used with chain locks now employed or may be used entirely independent of such locks. One end of the tire chain is connected to the free end of the links 14 or 20, while the opposite end of the tire chain is engaged in either of the notches 6 on the block. The lever 9 is then swung upon its pivot 8 until it passes over and incloses the block 5. The outer end of the lever prevents working loose of the chain link from the recesses 6, and after the trunnions or bosses 13 or 20 have passed below the plane of the pivot 8 and recesses 6, the lever will be locked against accidental outward swinging movement.

While the present disclosure is that of what is believed to be the preferred embodiment of the invention, it is to be understood that the invention is not limited thereto, but that various changes may be made in the construction, arrangement, and proportion of parts, without departing from the spirit of the invention as defined in the appended claim.

What is claimed is:—

In a device of the class described, a block formed with a plurality of notches at one end, a lever, including a pair of contiguous members spaced and connected along one of their edges, to receive the block therebetween, means pivotally connecting one end of the block to one end of the lever, a clevis embracing the connected edges of the lever, oppositely extending trunnions on the terminals of the clevis, and links pivotally connecting said trunnions.

In testimony whereof I affix my signature in presence of two witnesses.

GROVER C. CURTNER.

Witnesses:
 JOHN E. BURCH,
 CHARLES F. WILCOX.